(12) United States Patent
Rostek et al.

(10) Patent No.: US 8,109,298 B2
(45) Date of Patent: Feb. 7, 2012

(54) AIRCRAFT DUCT SYSTEM

(75) Inventors: Norbert Rostek, Osterholz-Scharmbeck (DE); Juergen Rehbock, Stuhr (DE)

(73) Assignee: Airbus Operations GmbH, Hamburg (DE)

( * ) Notice: Subject to any disclaimer, the term of this patent is extended or adjusted under 35 U.S.C. 154(b) by 258 days.

(21) Appl. No.: 12/455,222

(22) Filed: May 29, 2009

(65) Prior Publication Data

US 2009/0314373 A1    Dec. 24, 2009

Related U.S. Application Data

(60) Provisional application No. 61/057,457, filed on May 30, 2008.

(30) Foreign Application Priority Data

May 30, 2008  (DE) .......................... 10 2008 025 952

(51) Int. Cl.
*F16L 55/00*    (2006.01)
(52) U.S. Cl. .......................... 138/104; 138/155; 73/49.1
(58) Field of Classification Search .................. 138/104, 138/155; 73/49.1
See application file for complete search history.

(56) References Cited

U.S. PATENT DOCUMENTS

| 3,056,935 | A |   | 10/1962 | Jensen |
|---|---|---|---|---|
| 4,259,861 | A | * | 4/1981 | Yamamoto et al. ............... 374/4 |
| 4,372,693 | A | * | 2/1983 | Lutz .............................. 374/111 |
| 4,553,432 | A |   | 11/1985 | Barlian et al. |
| 4,735,095 | A |   | 4/1988 | Issel |
| 5,294,909 | A | * | 3/1994 | Frazier ........................... 338/26 |
| 5,778,938 | A | * | 7/1998 | Chick et al. ..................... 138/98 |
| 5,793,293 | A | * | 8/1998 | Melamud et al. ............. 340/596 |
| 6,026,862 | A | * | 2/2000 | Friedrich et al. .............. 138/112 |
| 6,216,745 | B1 | * | 4/2001 | Augustynowicz et al. ... 138/149 |
| 6,446,661 | B2 | * | 9/2002 | Armenia et al. .............. 137/312 |
| 6,550,499 | B1 | * | 4/2003 | Pai ................................. 138/104 |
| 7,011,102 | B2 | * | 3/2006 | Folkers ....................... 137/15.11 |

FOREIGN PATENT DOCUMENTS

| CH | 380979 | A  | 10/1964 |
|---|---|---|---|
| DE | 2943328 | A1 | 5/1981 |
| DE | 3434323 | C2 | 3/1986 |
| EP | 073322 | B1 | 3/1983 |

OTHER PUBLICATIONS

English language abstract of DE 29 43 328, Oct. 26, 1979, Kabel und Metallwerke Gutehoffnungshutte AG.

* cited by examiner

*Primary Examiner* — James Hook
(74) *Attorney, Agent, or Firm* — Krieg DeVault LLP

(57) ABSTRACT

A duct system comprises a duct region to be monitored and an aircraft leakage monitoring element (2). The aircraft leakage monitoring element comprises a sensor wire which is designed, at least in one section, in the shape of a coil with a plurality of windings.

11 Claims, 2 Drawing Sheets

AIRCRAFT DUCT SYSTEM

CROSS REFERENCE TO RELATED APPLICATIONS

Figure 1:
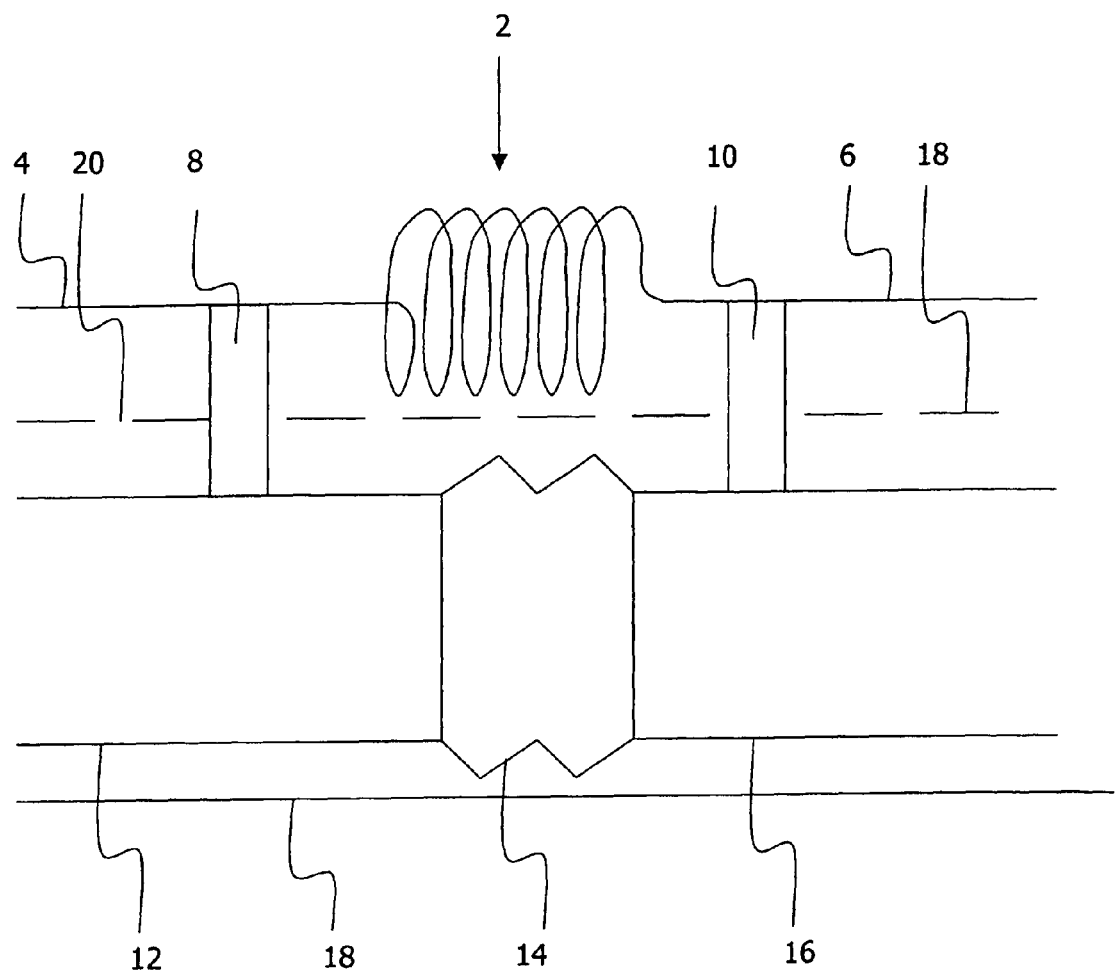

The present application claims priority to German Patent Application No. 10 2008 025 952.7, filed May 30, 2008 and claims the benefit of U.S. Provisional Patent Application No. 61/057,457, filed May 30, 2008, each of which is incorporated herein by reference.

The invention relates to an aircraft duct system equipped with an aircraft leakage monitoring element.

In aircraft, it is customary to monitor duct regions of a warm-air duct system for leakages by means of suitable aircraft leakage monitoring elements. Duct regions to be monitored may be the ducts of the aircraft warm-air duct system themselves, but also transition regions between ducts of the aircraft warm-air duct system which are connected to one another. The leakage monitoring elements normally comprise a sensor wire, which reacts, with a change of its physical properties, for example its electrical resistance, to the contact with a fluid escaping from a duct region to be monitored. The leakage monitoring elements may be arranged parallel to and/or above the ducts to be monitored or parallel to and/or above the transition regions, to be monitored, between ducts of the aircraft warm-air duct system which are connected to one another. Furthermore, a leakage monitoring element may also be arranged above a coupling element and/or a variable connector, designed for example in the form of a bellows, which is positioned between two ducts of the warm-air duct system which are connected to one another and serves to take up a change in length of one duct or both ducts caused by thermal expansion.

Leakage monitoring elements employed in aircraft to monitor duct regions of a warm-air duct system must normally have a variable length in order to compensate for changes in length of the duct regions to be monitored caused by thermal expansion or other tolerances like construction tolerances.

A known leakage monitoring element with a variable length is designed as a loop, the shape of which resembles an Ω. A change in length of a duct region to be monitored is compensated for, in the case of a leakage monitoring element of such a design, by ends of the loop, which are fastened to the duct region to be monitored, moving away from or towards one another.

Also known is a leakage monitoring element designed as a circular loop, the circular loop being arranged in the plane in which the change in length of a duct region to be monitored takes place. In the event of a change in length of the duct region to be monitored e.g. due to thermal expansion, the loop is moved apart or compressed.

It is further known to design a leakage monitoring element in a wave shape, the waves being arranged parallel to a longitudinal direction of the duct to be monitored. In the event of a change in length of the duct, the height of the waves changes.

The leakage monitoring elements known from the prior art have the disadvantage that, in the event of a change in length of the duct region to be monitored caused by e.g. thermal expansion, they move freely laterally, upwards and/or downwards. Consequently, it may happen that the leakage monitoring elements are damaged due to the interaction with an adjacent aircraft component. This may lead to failure of the leakage monitoring. Alternatively, a leakage monitoring element may be caused to incorrectly display a malfunction due to an interaction with an adjacent aircraft component. Finally, it is possible for a leakage monitoring element to be moved out of the region to be monitored due to the above-described movement.

It is an object of the invention to provide an aircraft duct system with a leakage monitoring element which is able to compensate for a change in length of a duct region to be monitored caused by thermal expansion, for example, without being damaged or caused to malfunction.

To achieve this object, an aircraft leakage monitoring element of an aircraft duct system according to the invention has a sensor wire, which reacts, with a change of its physical properties, for example its electrical resistance, to the contact with a fluid escaping from a duct region, to be monitored, of an aircraft duct system. The sensor wire is designed, at least in one portion, in the shape of a coil, i.e. helically, with a plurality of windings. The sensor wire comprises a first electrical conductor, a second electrical conductor and an insulator, insulating the first electrical conductor from the second electrical conductor. By expansion or compression in the direction of its longitudinal axis, the coil-shaped section of the aircraft leakage monitoring element can compensate in a simple manner for changes in length of the duct region, to be monitored, of the aircraft duct system caused e.g. by thermal expansion and for tolerances with regard to assembly. In contrast, in a direction perpendicular to its longitudinal axis, the coil-shaped section of the aircraft leakage monitoring element undergoes merely a small compression or expansion.

The coil-shaped configuration of the sensor wire of the aircraft leakage monitoring element has the advantage that the aircraft leakage monitoring element can change its length without substantially expanding in a direction perpendicular to its longitudinal axis, i.e. sideways, upwards and/or downwards. It can thus be ensured that the aircraft leakage monitoring element according to the invention, even in the event of a change in length, does not touch adjacent components of the aircraft and thus no malfunction of and/or damage to the aircraft leakage monitoring element occurs. Furthermore, the coil-shaped configuration of the sensor wire of the aircraft leakage monitoring element increases the possible service life of the aircraft leakage monitoring element, since a coil-shaped body can be compressed or expanded particularly frequently without damage occurring. Finally, the coil-shaped sensor wire of the aircraft leakage monitoring element has a smaller bending radius than sensor wires of leakage monitoring devices known from the prior art. As a result, the aircraft leakage monitoring element according to the invention can be designed in a particularly space-saving manner.

The sensor wire of the aircraft leakage monitoring element may be an electrical conductor, the resistance of which changes depending on the temperature. The resistance of the insulator may vary depending on the temperature, i.e. be a function of the temperature, or may be influenced by the contact with a fluid. The change in resistance of the insulator can be detected and evaluated by an evaluating device.

The second electrical conductor may surround the first electrical conductor. The insulator may be arranged between the first electrical conductor and the second electrical conductor. The first electrical conductor, the second electrical conductor and the insulator may be arranged coaxially. The insulator may be a eutectic salt. The insulator may have a higher resistance of e.g. about 1 MΩ/m at room temperature. If heat escapes from the duct to be monitored and the temperature of the aircraft leakage monitoring element increases, the insulator may have a reduced resistance of e.g. about 100 to 900 Ω/m.

The aircraft leakage monitoring element may be mounted in the aircraft duct system such that a longitudinal axis of the aircraft leakage monitoring element extending through the plurality of windings of the sensor wire substantially parallel to a longitudinal axis of a duct region, to be monitored, of the aircraft duct system. If a fluid escapes from the duct, it comes into contact with the sensor wire of the aircraft leakage monitoring element, and this is accompanied by the change of a physical property of the sensor wire of the aircraft leakage monitoring element which can be detected and evaluated by an evaluating device. The above-described coil-shaped configuration of the sensor wire of the aircraft leakage monitoring element enables changes in length of the duct region which is to be monitored and assembly tolerances to be compensated for simply and reliably without having to fear a malfunction and/or a failure of the aircraft leakage monitoring element.

The duct region, to be monitored, of the aircraft duct system may be a duct of the aircraft duct system itself but also a transition region between two ducts of the aircraft duct system which are connected to one another. In a transition region between a first and a second duct of the aircraft duct system there may also be provided a coupling element of variable length to compensate for changes in length of the ducts connected to one another. The coupling element may be fastened to the first and second duct by means of clamps. The coupling element may be a bellows. If the aircraft leakage monitoring element according to the invention is arranged at the transition from the first duct to the second duct, a change in length owing to thermal expansion and/or an assembly tolerance can be taken up particularly well. Since the aircraft leakage monitoring element does not, as described above, move sideways, upwards and/or downwards owing to the coil shape of the sensor wire, it is always situated in the vicinity of the transition from the first duct to the second duct. A duct transition is always a potential weak point in a duct system, which is prone to leakages. The aircraft leakage monitoring element according to the invention can therefore monitor such a transition particularly effectively.

At least one sleeve may be arranged around at least one of the ducts and/or the coupling element, the sleeve having at least one outlet opening which leads a fluid, escaping from the duct and/or the coupling element, in the direction of the aircraft leakage monitoring element. With such an arrangement, the escaping fluid is collected and led through the at least one opening in the sleeve in the direction of the aircraft leakage monitoring element. As a result, the sensitivity of the aircraft leakage monitoring element can be increased and/or the aircraft leakage monitoring element can respond more rapidly to an escape of a fluid.

The fluid conveyed in the aircraft duct system may be a gas, in particular air. In this case, the aircraft leakage monitoring element according to the invention is arranged above a duct and/or a transition of a plurality of ducts. The fluid conveyed in the aircraft duct system may, however, also be a liquid, for example kerosene. In this case, the aircraft leakage monitoring element may be arranged below a duct and/or a transition of two ducts. It is also conceivable for the aircraft leakage monitoring element to be arranged above the duct or the transition of two ducts in the case of a liquid fluid, where evaporation of the liquid fluid is to be detected.

It is possible to arrange a plurality of aircraft leakage monitoring elements in series in the aircraft duct system. In principle, all of the aircraft leakage monitoring elements used to monitor the aircraft duct system may be aircraft leakage monitoring elements according to the invention. Alternatively, an aircraft leakage monitoring element according to the invention may, however, also only be provided to monitor a transition between two ducts of the duct system. Ducts of the aircraft duct system may, in contrast, be monitored by substantially rectilinearly shaped sensor lines which follow the course of the ducts. It is understood that the substantially rectilinearly shaped sensor lines have a curvature at the places where a duct to be monitored is curved. With the exception of the coil-shaped configuration, the sensor lines may have a similar construction to the sensor wire of the aircraft leakage monitoring element according to the invention. The aircraft leakage monitoring elements according to the invention which are used in the aircraft duct system may be connected to one another by sensor lines.

Figure 2:
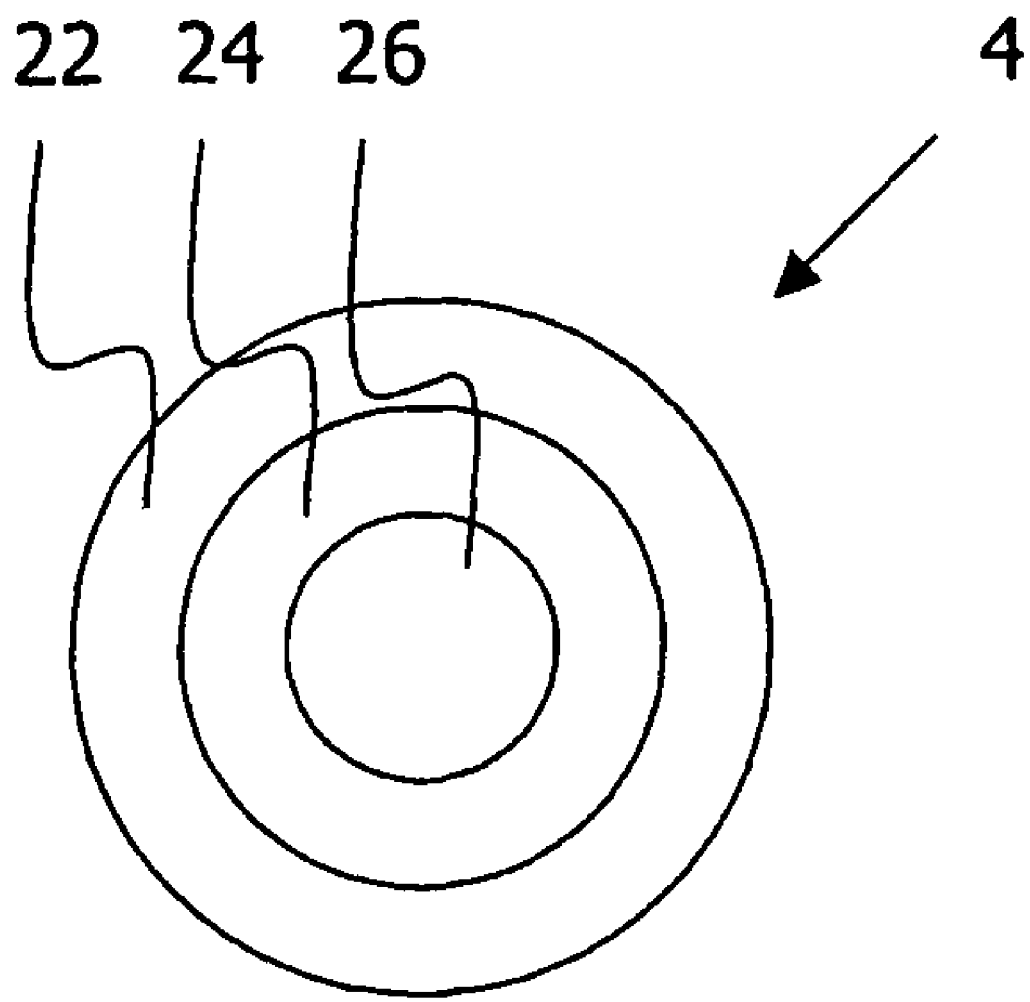

The invention is explained in more detail below with reference to the schematic figures, wherein FIG. 1 shows a transition from a first duct to a second duct of an aircraft duct system and an aircraft leakage monitoring element according to the invention; and FIG. 2 shows a cross section through a sensor wire.

FIG. 1 shows a first duct 12 and a second duct 16 of an aircraft duct system. A bellows 14 is arranged in the transition region between the first duct 12 and the second duct 16. The duct system can convey warm air, which is supplied to a cabin, and/or hot bleed air, which is supplied to a cabin and/or an air conditioning system. Above the first duct 12 is arranged a first sensor line 4, which detects a leakage of air from the first duct 12. Above the second duct 16 is arranged a second sensor line 6, which detects a leakage of air from the second duct 16. Above the bellows 14 is arranged an aircraft leakage monitoring element 2, which comprises a sensor wire designed in the shape of a coil or helix with a plurality of windings. The aircraft leakage monitoring element 2 is arranged such that a longitudinal axis of the aircraft leakage monitoring element 2 extends parallel to a longitudinal axis of the transition region, to be monitored, between the first duct 12 and the second duct 16 and/or a duct region to be monitored.

Around the first duct 12, the second duct 16 and the bellows 14 is arranged a sleeve 18, which has openings 20. Air escaping from the first duct 12, the second duct 16 and/or the bellows 14 is led through the openings 20 in the direction of the first sensor line 4, the second sensor line 6 and/or the aircraft leakage detecting element 2. The sleeve 18 having the openings 20 is used to increase the sensitivity of the first sensor line 4, the second sensor line 6 and the aircraft leakage monitoring element 2, and to reduce their response time. The sleeve 18 may be formed of one or more pieces. The bellows 14 may be fastened to the first duct 12 and the second duct 16 by clamps (not shown).

The first sensor line 4 may be fastened to the first duct 12 by means of a first fastening 8. The second sensor line 6 may be fastened to the second duct 16 by means of a second fastening 10. The fastenings 8, 10 can be thermally insulated so that the sensor line 4, 6 is not heated by the mechanical contact with the first or second duct 12, 16. It is also possible for the aircraft leakage monitoring element 2 to be fastened to the first fastening 8 and the second fastening 10. The aircraft leakage monitoring element 2 may be connected to the first sensor line 4 and the second sensor line 6 by means of a suitable coupling (not shown). It is understood that the first sensor line 4, the aircraft leakage monitoring element 2 and the second sensor line 6 may also be of integrated design.

With reference to FIG. 2, the first sensor line 4, the second sensor line 6 and the sensor wire of the aircraft leakage monitoring element 2 have a first electrical conductor 26, a second conductor 22, arranged around the first electrical conductor 26, and an insulator 24 arranged between the first electrical conductor 26 and second electrical conductor 22 and insulating the first electrical conductor 26 from the second electrical conductor 22. The insulator 24 is preferably a eutectic salt. At room temperature, the insulator 24 has a resistance of e.g. about 1 MΩ/m. Under the effect of heat owing to air escaping from the first duct 12, the second duct 16 and/or the bellows 14, the resistance of the insulator 24 is, in contrast, e.g. only about 10 to about 900 Ω/m. This change in resistance can be detected and evaluated by an evaluating device (not shown). The insulator 24 is arranged coaxially around the first electrical conductor 26. The second electrical conductor 22 is arranged coaxially around the insulator 24 and thus also around the first electrical conductor 26.

With reference to FIG. 1, the first duct 12 and/or the second duct 16 may change their length owing to a change in temperature of the air conveyed in the ducts. As a result, the length of the bellows 14 also changes. Furthermore, the position of the first fastening 8 and the second fastening 10 changes. As a result, the aircraft leakage monitoring element 2 expands in the direction of its longitudinal axis. In contrast, it undergoes a compression in a direction perpendicular to its longitudinal axis. Consequently, the aircraft leakage monitoring element 2 does not touch any adjacent components of the aircraft, so that no malfunction, for example a false alarm, of and no damage to the aircraft leakage monitoring element 2 can occur. Since the sensor wire of the aircraft leakage monitoring element 2 is designed in the shape of a coil or helix, it can change its length particularly easily. Furthermore, the aircraft leakage monitoring element 2 can withstand a relatively large number of size-change cycles owing to the coil- or helix-shaped configuration of the sensor wire, since only comparatively low bending, stress, wear or the like occur in the event of a change in size. The coil shaped aircraft leakage monitoring element 2 can compensate any mechanical tolerance, such as a length tolerance of the first and/or second duct 12, 16 as well as of the first and/or second sensor line 4, 6.

It is to be understood that the principles of the illustrated embodiment may also be employed, as described above, for monitoring other gases and for monitoring liquids.

The invention claimed is:

1. Aircraft duct system, comprising,
a duct region to be monitored, and
an aircraft leakage monitoring element comprising a sensor wire which is designed, at least in one portion, in the shape of a coil with a plurality of windings,
wherein the sensor wire comprises a first electrical conductor, a second electrical conductor and an insulator insulating the first electrical conductor from the second electrical conductor, and
wherein a longitudinal axis extending through the plurality of windings of the portion of the sensor wire is disposed offset from a longitudinal axis of the duct region to be monitored such that the sensor wire is disposed outside of the duct region to be monitored.

2. Aircraft duct system according to claim 1, wherein the insulator has a variable electrical resistance depending on the temperature.

3. Aircraft duct system according to claim 1, wherein the second electrical conductor surrounds the first electrical conductor and the insulator is arranged between the first electrical conductor and the second electrical conductor.

4. Aircraft duct system according to claim 1, wherein the insulator is a eutectic salt.

5. Aircraft duct system according to claim 1, wherein the longitudinal axis extending through the plurality of windings of the sensor wire extends essentially parallel to the longitudinal axis of the duct region to be monitored.

6. Aircraft duct system according to claim 1, wherein the duct region, to be monitored, of the aircraft duct system is a transition region from a first duct to a second duct of the aircraft duct system.

7. Aircraft duct system according to claim 1, wherein a coupling element of variable length is arranged between the first duct and the second duct, and the aircraft leakage monitoring element is arranged above the coupling element.

8. Aircraft duct system according to claim 1, wherein a sleeve is arranged around the duct region, to be monitored, of the aircraft duct system, the sleeve having at least one outlet opening which leads a fluid, escaping from a duct and/or the coupling element, in the direction of the aircraft leakage monitoring element.

9. Aircraft duct system according to claim 1, wherein the fluid conveyed in the aircraft duct system is a gas.

10. Aircraft duct system according to claim 9, wherein the gas conveyed in the aircraft duct system is air.

11. Aircraft duct system according to claim 9, wherein the sensor wire including the portion comprising the windings, is disposed radially offset from the duct to be monitored.

* * * * *